(12) United States Patent
Chan et al.

(10) Patent No.: US 6,382,084 B2
(45) Date of Patent: May 7, 2002

(54) ELECTRIC TOASTER

(75) Inventors: Stephen Wai-Kin Chan; Wing Chung Li, both of Hong Kong (HK)

(73) Assignee: Simatelex Manufactory Co., Ltd. (HK)

( * ) Notice: Subject to any disclaimer, the term of this patent is extended or adjusted under 35 U.S.C. 154(b) by 0 days.

(21) Appl. No.: 09/874,812

(22) Filed: Jun. 5, 2001

(51) Int. Cl.[7] .............................. A47J 37/08; F24C 7/10
(52) U.S. Cl. ................... 99/327; 99/329 P; 99/329 RT; 99/337; 99/385; 99/389; 99/391; 219/386; 219/391; 219/393; 219/494; 219/521
(58) Field of Search .................. 99/337, 338, 325–333, 99/400, 401, 385–399; 219/385, 386, 387, 391–393, 520, 521, 544, 518, 492, 494, 497, 222, 481, 489, 400, 399; 392/433, 373, 375, 337, 407; 426/241, 243, 466, 523; 132/229, 233

(56) References Cited

U.S. PATENT DOCUMENTS

| | | | | |
|---|---|---|---|---|
| 1,893,989 A | * | 1/1933 | Galer | ................... 99/327 X |
| 1,926,276 A | * | 9/1933 | Forbes | ..................... 99/332 |
| 1,967,209 A | * | 7/1934 | Lawrence | ................ 99/327 |
| 1,979,845 A | * | 11/1934 | Schallis | ..................... 99/332 |
| 2,631,523 A | * | 3/1953 | Olving | ................... 99/331 X |
| 3,956,978 A | * | 5/1976 | Borley | .................. 99/329 R |
| 4,345,513 A | * | 8/1982 | Holt | ....................... 99/401 X |
| 5,018,437 A | * | 5/1991 | San Juan | ................... 99/327 |
| 5,044,263 A | * | 9/1991 | Birkert et al. | ............. 99/327 |
| 5,304,782 A | * | 4/1994 | McNair et al. | ....... 219/497 X |
| 5,771,780 A | * | 6/1998 | Basora et al. | .......... 99/389 X |
| 5,802,957 A | * | 9/1998 | Wanat et al. | ......... 219/521 X |
| 6,014,925 A | * | 1/2000 | Basora et al. | ............... 99/327 |

* cited by examiner

Primary Examiner—Timothy F. Simone
(74) Attorney, Agent, or Firm—Jackson Walker L.L.P.

(57) ABSTRACT

In an otherwise well-known electric pop-up toaster, an auxiliary power switch is provided and is arranged to be opened by a timer after each toasting cycle. This ensures, in contrast to the well-known toaster arrangements, that power is interrupted to heating elements even if a carriage supporting slices of toast fails to move up at the end of a toasting cycle.

2 Claims, 3 Drawing Sheets

ELECTRIC TOASTER

The invention relates to electric toasters.

Electric toasters or so-called "pop-up toasters" are well-known and typically include timers or other devices to automatically turn off electrical power to heating elements at the end of each toasting cycle. At the same timer a spring biassed bread carriage is released inside the toaster to lift up the toast and cause the toast to "pop-up" and be removed for use. Commonly the opening of a switch and the mechanical release of a carriage hold-down catch are inter-related and so if the carriage jams, the power may be prevented from being turned OFF. This leads to the possibility of burning the toast and also creating a fire-hazard.

It is an object of the invention to overcome this problem.

According to the invention there is provided an electric pop-up toaster having a timer for timing each toasting cycle, a spring biassed carriage and a hold-down catch for retaining the carriage in a lower position for toasting, a power switch for heater elements of the toaster that is closed by the carriage whenever the carriage is in its lower position and opens when the carriage moves away, and an auxiliary power switch that is opened by the timer after the end of toasting cycles.

The timer may be arranged to open the auxiliary power switch and release the hold down catch simultaneously An electric pop-up toaster according to the invention will now be described by way of example with reference to the accompanying drawings in which FIG. 1 is an elevation of the toaster;

Figure 1:
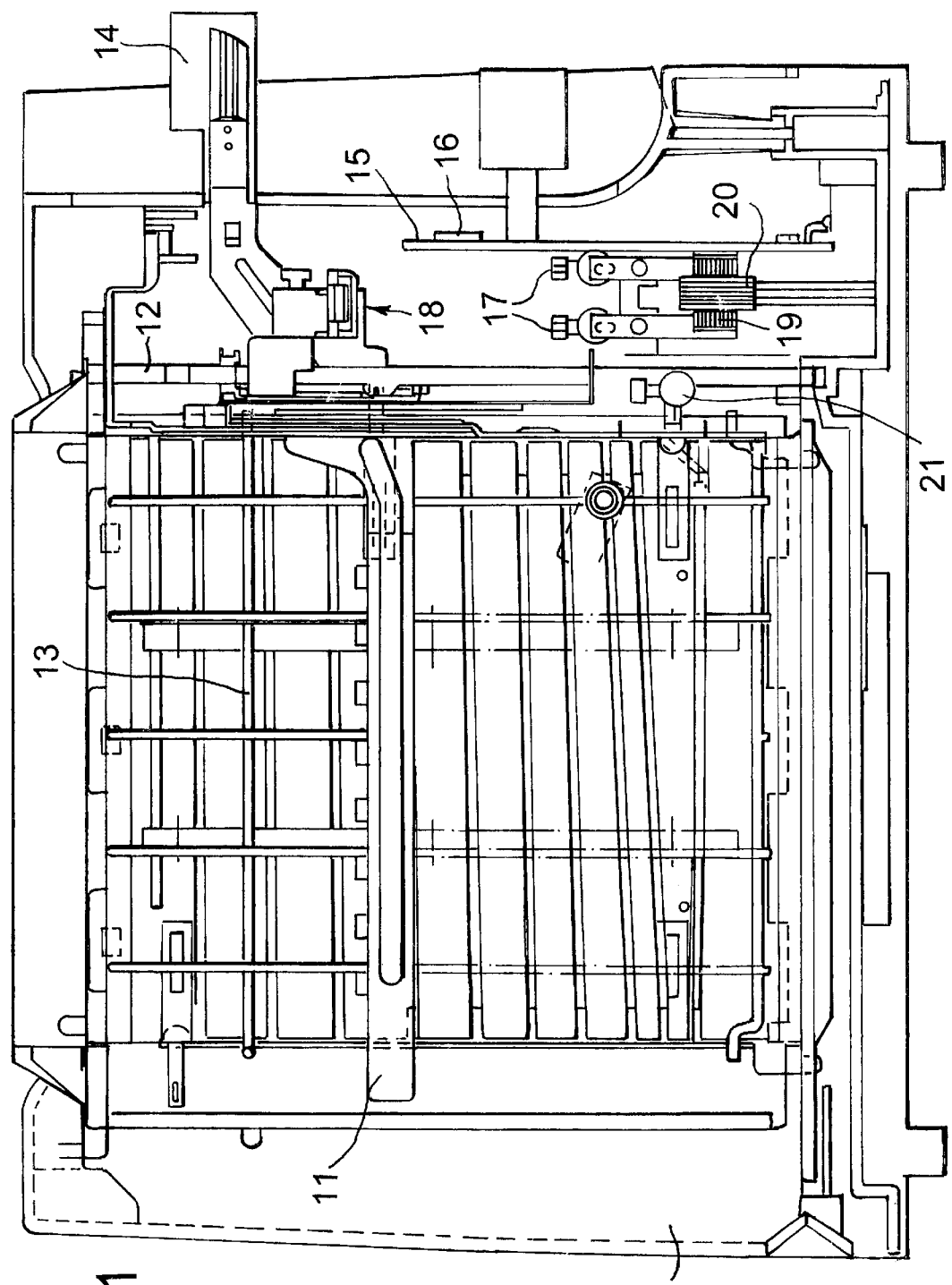

Referring to the drawings, in FIG. 1 a housing 10 surrounds a carriage 11 that is slidably mounted in the housing and biassed to an upper position, as shown in the Figure, by a spring 12. Heating elements 13 are provided and supplied with electrical power for toasting bread as required. A manually grippable handle 14 is coupled to the carriage 11 for moving the carriage down to a lower position A printed circuit board 15 is mounted in the housing and a timer 16 is mounted to the board 15. A carriage hold-down catch consists of a pair of conductors 17 and a latching plate 18 that closes across the conductors when the carriage is in its lower position. The latching plate 18 is held against the plate as long as current is supplied to a coil 19 surrounding a ferro-magnetic core 20. A main power switch 21 for both the heating elements 13 and powering the printed circuit board 15 is closed by moving the carriage 11 to its lower position.

The toaster so far described is in wide commercial use already. In use of the known toasters, bread slices are placed in the toaster on top of the carriage 11 and the handle 14 is pressed down to move the carriage and the bread slices down the lower position. The power switch 21 is turned ON and the timer begins a pre-set (manually adjustable) timing period to toast the bread slices. Closure of the power switch 21 causes current to flow in the coil 19 so that the latch 18 is held against the conductors 17. This holds the carriage in its lower position against the bias of the spring 12. At the end of a toasting cycle, the timer turns off the current in the coil so that the latch 18 (the so-called "hold-down catch") is released and the carriage moves up to allow the power switch 21 to OPEN when the toast "pops-up". Current to the heating elements is therefore cut-off.

A problem and the possibility of a fire hazard arise if, when the latch 18 is released, the carriage fails to move up under the bias of the spring 12. (This may arise due to the carriage jamming or being held down by toasted bread on the carriage.) If this happens, the power switch 21 does not OPEN and the heating element continues to be supplied with power.

Figure 2:
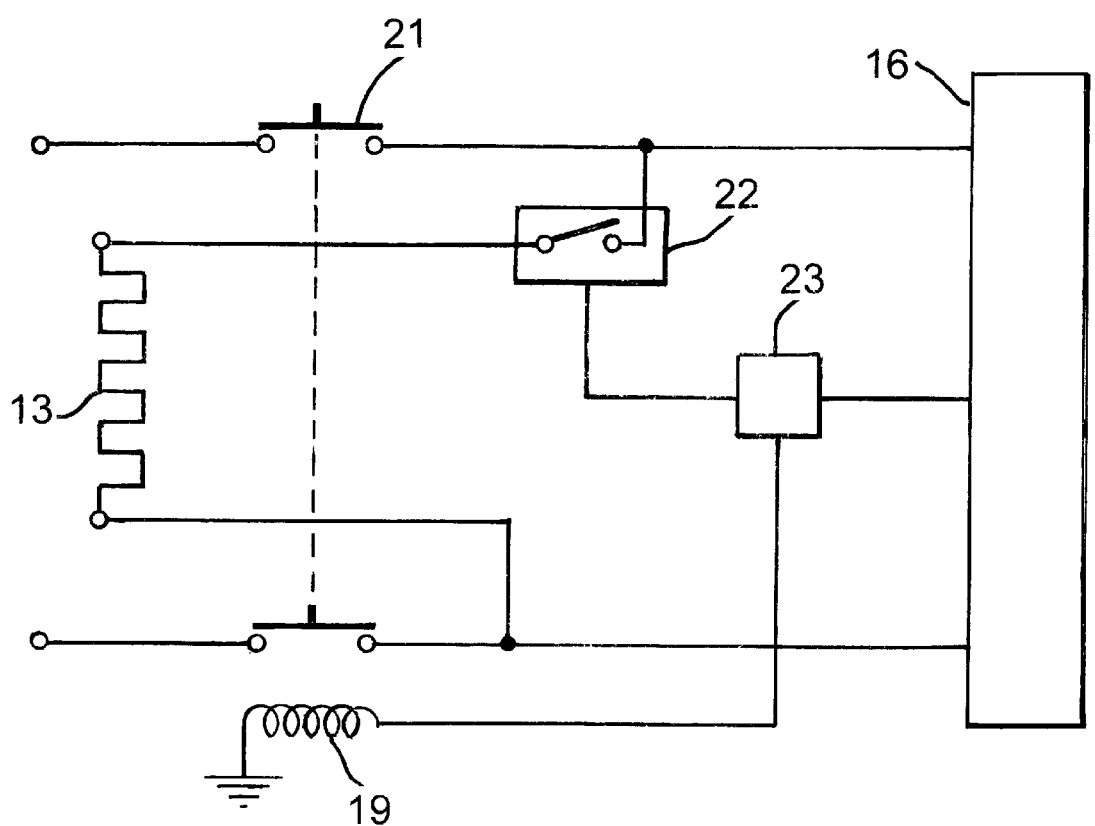
FIG. 2 is a schematic circuit diagram for the toaster.

To overcome this problem, embodiments of the invention are provided with an auxiliary power switch 22 shown in FIG. 2. The auxiliary switch 22 is closed by a driving circuit 23 while the power switch 21 is turned on. The timer 16 is arranged at the end of each toasting cycle to release the auxiliary switch 22 by disenabling the driving circuit 23. As in conventional toasters, the discontinuity of current to the coil 19 opens the main power switch 21. That means not only is the latch 18 released but also power to the heating elements 11 is interrupted by opening of the auxiliary switch 22. Thus, although the power switch 21 may remain CLOSED, because the carriage has not moved upwards, no further heating of the toast will occur.

The circuit can be reset by turning off power of the toaster or forcing the handle 14 upwards to allow the power switch 21 to open. In a normal operation of the toaster, that is when the carriage moves up normally at the end of a toasting cycle and the main power switch 21 has opened, the auxiliary switch 22 opens at the same time.

Figure 3:
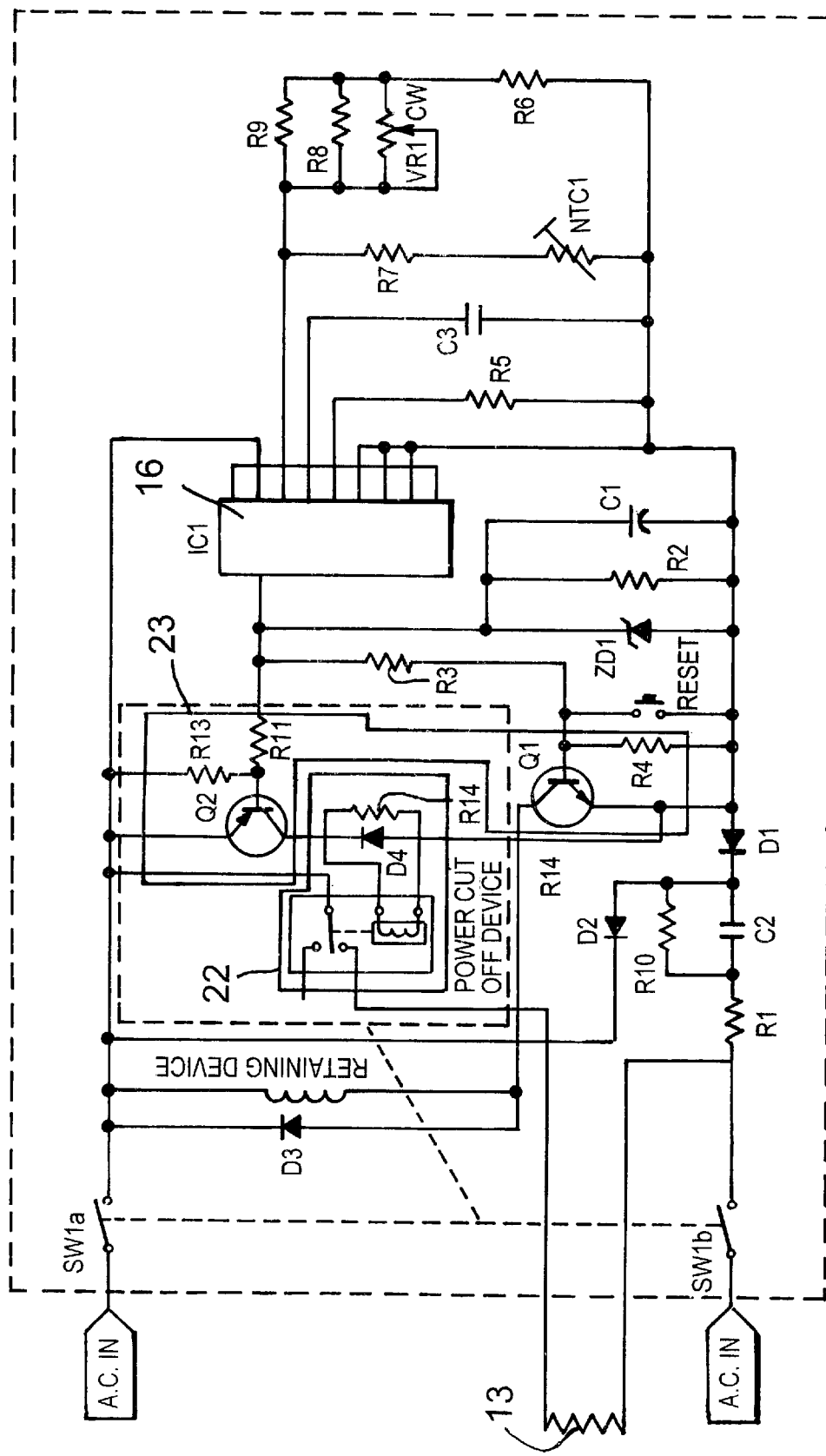
FIG. 3 is a circuit diagram for the toaster.

FIG. 3 shows the circuit components of the toaster.

What is claimed is:

1. An electric pop-up toaster having a timer for timing each toasting cycle, a spring biassed carriage and a hold-down catch for retaining the carriage in a lower position for toasting, a power switch for heater elements of the toaster that is closed by the carriage whenever the carriage is in its lower position and opens when the carriage moves away, and an auxiliary power switch that is opened by the timer after the end of toasting cycles.

2. An electric pop-up toaster according to claim 1, in which the timer is arranged to open the auxiliary power switch and release the hold down catch simultaneously.

* * * * *